United States Patent
Cota-Robles et al.

(10) Patent No.: US 9,298,375 B2
(45) Date of Patent: Mar. 29, 2016

(54) METHOD AND APPARATUS FOR RETURNING READS IN THE PRESENCE OF PARTIAL DATA UNAVAILABILITY

(71) Applicant: VMware, Inc., Palo Alto, CA (US)

(72) Inventors: Erik Cota-Robles, Mountain View, CA (US); Thomas A. Phelan, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 173 days.

(21) Appl. No.: 13/779,112

(22) Filed: Feb. 27, 2013

(65) Prior Publication Data

US 2014/0244938 A1    Aug. 28, 2014

(51) Int. Cl.
  *G06F 3/06*    (2006.01)
  *G06F 9/30*    (2006.01)

(52) U.S. Cl.
  CPC .............. *G06F 3/0611* (2013.01); *G06F 9/30* (2013.01)

(58) Field of Classification Search
  CPC .............. G06F 12/0862; G06F 9/393; G06F 2212/6028
  USPC ........................................................ 711/137
  See application file for complete search history.

(56) References Cited

U.S. PATENT DOCUMENTS

| | | | | | |
|---|---|---|---|---|---|
| 5,615,392 | A | * | 3/1997 | Harrison | G06F 12/145 710/56 |
| 6,085,287 | A | * | 7/2000 | O'Neil | G06F 12/0862 711/113 |
| 6,226,719 | B1 | * | 5/2001 | Minow | 711/154 |
| 6,553,476 | B1 | * | 4/2003 | Ayaki et al. | 711/204 |
| 8,239,589 | B1 | * | 8/2012 | Certain | G06F 13/1626 710/39 |
| 2003/0033477 | A1 | * | 2/2003 | Johnson | G06F 3/0601 711/114 |
| 2006/0230236 | A1 | * | 10/2006 | Finkelstein | G06F 12/0862 711/137 |
| 2011/0153983 | A1 | * | 6/2011 | Hughes | G06F 9/30018 712/22 |
| 2013/0151493 | A1 | * | 6/2013 | Roth | H04N 21/2343 707/703 |
| 2013/0283391 | A1 | * | 10/2013 | Mangalampalli | G06F 21/10 726/26 |

* cited by examiner

*Primary Examiner* — Christian P Chace
*Assistant Examiner* — Jane Wei (57) ABSTRACT

Techniques are disclosed for reducing perceived read latency. Upon receiving a read request with a scatter-gather array from a guest operating system running on a virtual machine (VM), an early read return virtualization (ERRV) component of a virtual machine monitor fills the scatter-gather array with data from a cache and data retrieved via input-output requests (IOs) to media. The ERRV component is configured to return the read request before all IOs have completed based on a predefined policy. Prior to returning the read, the ERRV component may unmap unfilled pages of the scatter-gather array until data for the unmapped pages becomes available when IOs to the external media complete. Later accesses to unmapped pages will generate page faults, which are handled by stunning the VMs from which the access requests originated until, e.g., all elements of the SG array are filled and all pages of the SG array are mapped.

21 Claims, 5 Drawing Sheets

METHOD AND APPARATUS FOR RETURNING READS IN THE PRESENCE OF PARTIAL DATA UNAVAILABILITY

BACKGROUND

Enterprise storage systems employ disk arrays that are physically independent enclosures containing a disk array controller, a disk cache and multiple physical disk drives. The disk array controller manages the physical disk drives and exposes them to connected computer systems as logical data storage units, each identified by a logical unit number (LUN). Enterprise storage may be provided through a cloud environment such that shared storage resources are provided on-demand (e.g., over a wide area network (WAN)) to computers and other devices.

Cloud-based storage can provide accessibility, replication of data, and seamless failover, among other advantages. However, considerable time may be required to retrieve data from cloud storage. For example, large physical distances may need to be traversed to satisfy a read request. As another example, multiple read requests to different data blobs may be required even when data is read from contiguous logical block addressing (LBA) addresses. High read latency can, in turn, reduce the performance of applications and operating systems making read requests to the cloud-based storage system, because data cannot quickly be retrieved for use.

SUMMARY

Embodiments presented herein provide techniques for reducing perceived read latency. The techniques include receiving a read request from a reader and issuing, via one or more processors, input-output requests (IOs) to storage media. The techniques further include, prior to completing the read request, returning a response to the reader based on one or more conditions of a predefined policy, where the policy is defined based on at least one of a percentage of data corresponding to the read request available to return, a relative distribution of unavailable data in a scatter-gather array configured to store data associated with the read request, and an estimated time duration until full satisfaction of the read request. Prior to returning the read request, unfilled pages of the scatter-gather array are unmapped.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein provide techniques for reducing perceived read latency by selectively returning reads which are partially satisfied, with missing pages unmapped. A guest operating system (OS) running on a virtual machine may issue a read request with a scatter-gather array, often in direct response to a file IO by an application running on the guest OS. Upon receiving the read request and the scatter-gather array, an early read return virtualization (ERRV) component of a virtual machine monitor (VMM) fills the scatter-gather array with data from a cache and data retrieved via input-output requests (IOs) to external media. The ERRV component may return the read request before all IOs to the external media have completed (and before the scatter-gather array is completely filled) if condition(s) for such return under a given policy are satisfied. In one embodiment, the policy may be based on at least one of a percentage of data available for immediate return, a relative distribution of unavailable data, and an estimated time duration until full satisfaction of the read request. In a further embodiment, the ERRV component may predict using pattern recognition whether the guest OS is performing prefetching and, if such is the case, return the read as complete after, e.g., a first portion of the data being read is available. Prior to returning the read, the ERRV component may unmap unfilled pages of the scatter-gather array until the data for the unmapped pages becomes available when the IOs to the external media complete. Later accesses to such unmapped pages will generate page fault exceptions, which may be handled by stunning the VM from which the access requests originated until, for example, all elements of the SG array are filled and all pages of the SG array are mapped when the IOs to the external media complete.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1A:
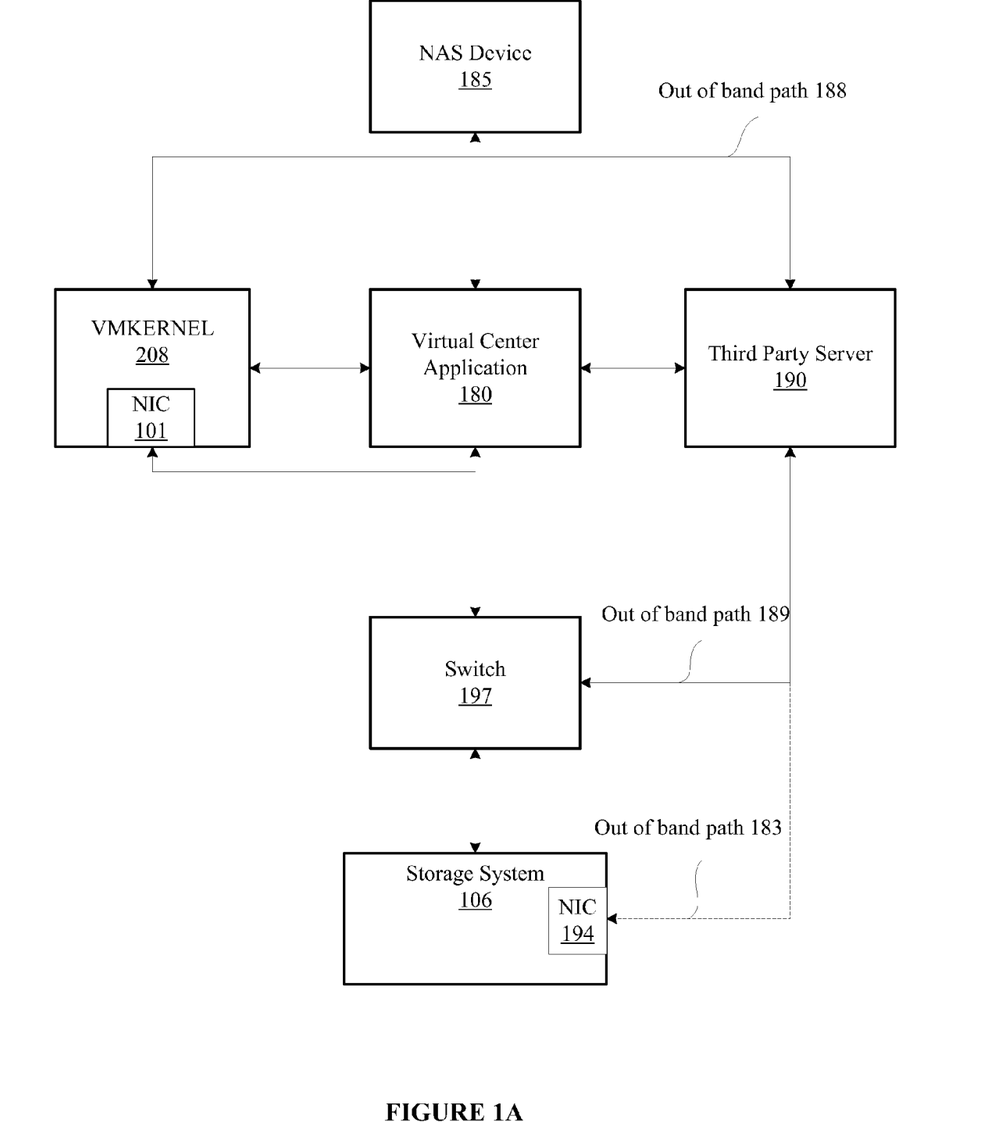
FIG. 1A illustrates a virtualized computer system topology in which an embodiment of the invention may be practiced.

FIG. 1A illustrates a virtualized computer system topology in which one or more embodiments of the invention may be practiced. As shown, a computer system includes VMkernel 208 and is running software referred to as a Virtual Center application 180. The VMkernel 208 may be a VMware ESX Server™ that includes a storage stack with a Virtual Machine File System (VMFS) running on a server machine. In one embodiment, Virtual Center application 180 may manage one or more VMKernels 208 and runs on a server machine. As shown in FIG. 1A, Virtual Center application 180 is in communication with both VMKernel 208 and a third party server 190 to provide out of band paths 188, 189, and 183 from VMKernel 208 to storage devices, e.g., network attached storage (NAS) device 185 and storage system 106, e.g., a disk array. In one embodiment, NAS device 185 and storage system 106 may be provided via a cloud environment which enables shared storage resources to be provided on-demand to computers and other devices. Here, VMKernel 208, Virtual Center application 180, and third party server 190 may be co-located in the cloud. Of course, VMKernel 208, Virtual Center application 180, and third party server 190 may also be in different locations connected by a network.

As shown in FIG. 1A, switch 197 is coupled between storage system 106, virtual center application 180, VMKernel 208, and third party server 190. In one embodiment, switch 197 is a device that includes: (a) a fast interconnect and data path processor to switch packets; and (b) a control path processor to provide I/O packet switching and fabric virtualization services. In some embodiments, switch 197 is omitted; storage system 106 resides in a separate data center from third party server 190; and third party server 190 communicates with storage system 106 via out of band path 183 and NIC 194 (network interface card) installed in storage system 106. Further, additional switches 197 and storage systems 106 may be included in a system with one or more storage systems 106 residing in different data centers.

Figure 1B:
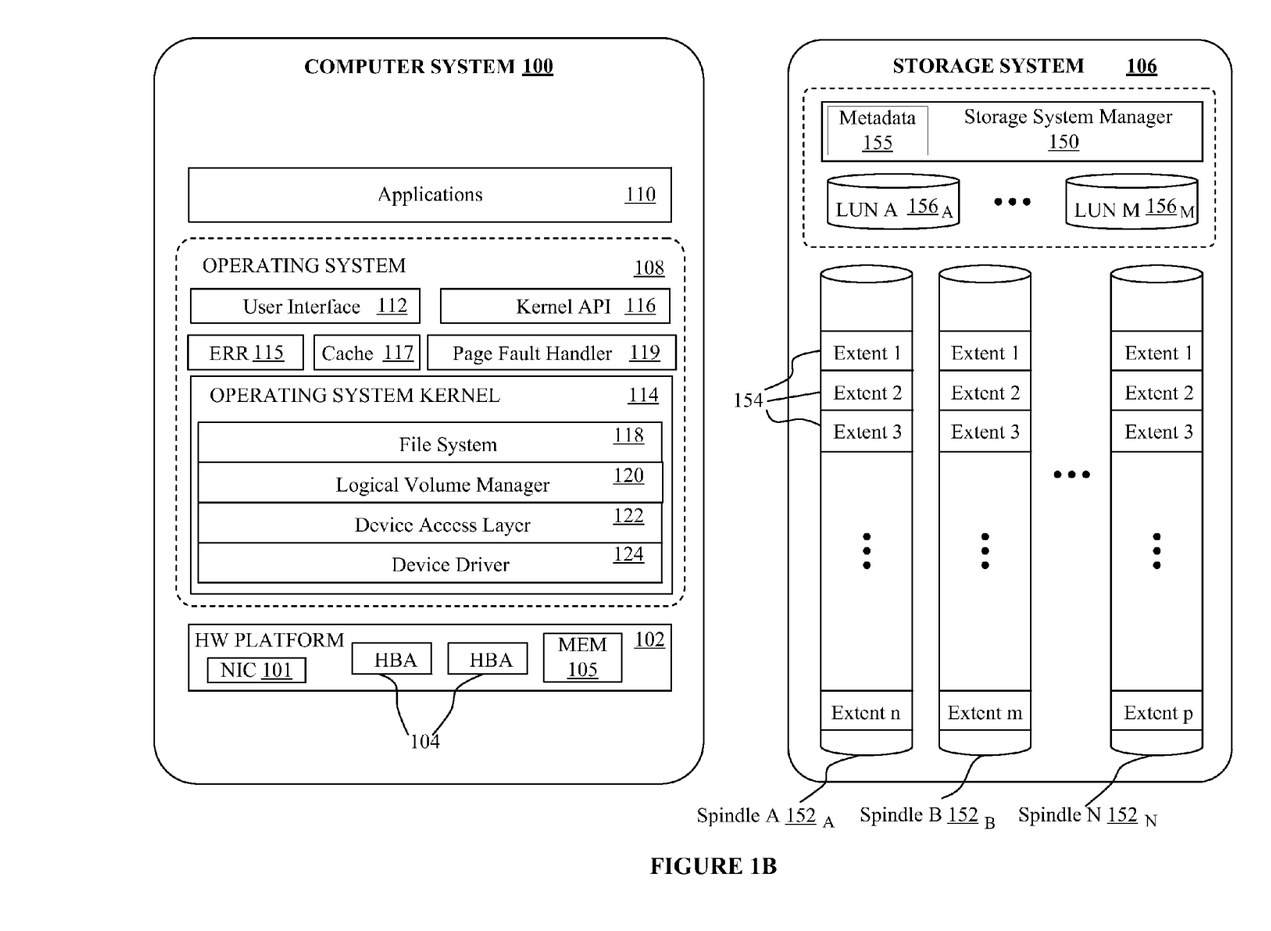
FIG. 1B illustrates a computer system connected to a storage system in which an embodiment of the invention may be practiced.

FIG. 1B illustrates a computer system with a connected storage system, in which one or more embodiments of the invention may be practiced. Computer system 100 may be constructed on a conventional, typically server-class, hardware platform 102. As shown in FIG. 1B, computer system 100 includes host bus adapters (HBA) 104 that enable computer system 100 to connect to storage system 106. Examples of storage systems 106 may be a network attached storage (NAS) device, storage area network (SAN) arrays, or any other similar disk arrays known to those with ordinary skill in the art. A storage system 106 that is a NAS device may be connected to computer system 100 through NIC 101. As further discussed below, disk arrays such as SAN arrays may typically provide block-level access to their storage through SCSI-based protocols such as Fibre Channel and iSCSI. Those with ordinary skill in the art will recognize that enterprise-level implementations of the foregoing may have multiple computer systems similar to computer system 100 that may be connected through various different known topologies and technologies (e.g., switches, etc.) to multiple storage systems 106.

In storage system 106, storage system manager 150, which represents one or more programmed storage processors, serves as a communication agent (to the outside world) for storage system 106. Further, storage system manager 150 may implement a virtualization of physical storage units, referred to in FIG. 1B as spindles $152_A$-$152_N$, that reside in storage system 106. Spindles $152_A$-$152_N$ are collectively referred to herein as spindles 152. From a logical perspective, each spindle can be viewed as a sequential array of fixed sized extents 154. Storage system manager 150 abstracts away complexities of targeting read and write operations to addresses of the actual spindles and extents of the disk drives by exposing to computer system 100 an ability to view the aggregate physical storage space provided by the disk drives as a contiguous logical storage space that may be divided into a set of virtual SCSI devices known as LUNs (Logical Units) $156_A$-$156_M$. The virtualization of spindles $152_A$-$152_N$ into such a contiguous logical storage space of LUNs $156_A$-$156_M$ may provide a more efficient utilization of the aggregate physical storage space that is represented by an address space of a logical volume. Storage system manager 150 exposes to computer system 100 an ability to transmit data transfer and control operations to storage system 106 at a LUN "block" level, where a block is a particular contiguous region in a particular LUN. For example, a LUN block may be represented as <LUN ID, offset, length> and computer system 100 may transmit to storage system 106 a read operation for block <LUN ID, offset, length> in the form of a SCSI operation.

The LUN identifier (LUN ID) is a unique, SCSI protocol compliant, identifier value that is retrievable in response to a standard SCSI Inquiry command.

Storage system manager 150 maintains metadata 155 that includes a mapping (hereinafter, also referred to as an extent-mapping) for each of LUNs $156_A$-$156_M$ to an ordered list of extents, wherein each such extent can be identified as a spindle-extent pair <spindle #, extent #> and may therefore be located in any of the various spindles $152_A$-$152_N$. As such, whenever storage system manager 150 receives a LUN block operation from computer system 100, it is able to utilize the extent-map of the LUN to resolve the block into an appropriate list of extents located in various spindles $152_A$-$152_N$ upon which the operation is performed. Those with ordinary skill in the art will recognize that, while specific storage system manager implementation details and terminology may differ as between different storage device manufacturers, the desired consistent result is that the externally visible LUNs implement the expected semantics (in this example, SCSI semantics) needed to respond to and complete initiated transactions.

When storage system 106 is a NAS device, storage system manager 150 exposes to computer system 100 an ability to transmit data transfer and control operations to storage system 106 at the file level. In contrast with SAN storage, LUNs $156_A$-$156_M$ are managed within the NAS device. Storage system manager 150 manipulates files (performs I/O for files using block addresses, change file length and attributes, and the like) stored on the NAS device using file handles. When storage system manager 150 receives a file operation from computer system 100, it finds the location of the files being operated on within spindles $152_A$-$152_N$ using the filehandle specified by the file operation and performs the operation.

Returning to computer system 100, operating system 108 is installed on top of hardware platform 102 and it supports execution of applications 110. Examples of operating system 108 may be Microsoft Windows®, Linux®, Netware-based operating systems or any other operating system. Users may interact with computer system 100 through a user interface 112 such as a graphical user interface or a command based shell, while executing applications 110 may access computing resources of computer system 100 that are managed by operating system kernel 114 through kernel application programming interface (API) 116. Kernel 114 provides process, memory and device management to enable various executing applications 110 to share limited resources of computer system 100. For example, file system calls initiated by applications 110 through kernel API 116 are routed to file system 118. File system 118, in turn, converts the file system operations to volume block operations, and provides the volume block operations to logical volume manager 120. File system 118, in general, manages creation, use, and deletion of files stored on storage system 106 through the LUN abstraction discussed previously. Logical volume manager 120 translates the volume block operations for execution by storage system 106, and issues raw SCSI operations (or operations from any other appropriate hardware connection interface standard protocol known to those with ordinary skill in the art, including IDE, ATA, SAS and SATA) to device access layer 122 based on the LUN block operations.

Device access layer 122 discovers storage system 106, and applies command queuing and scheduling policies to the raw SCSI operations. Device driver 124 understands the input/output interface of HBAs 104 interfacing with storage system 106, and sends the raw SCSI operations from device access layer 122 to HBAs 104 to be forwarded to storage system 106. As previously discussed, storage system manager 150 of storage system 106 receives the raw SCSI operations (i.e., LUN block level operations), and resolves them into the appropriate extents within the spindles of the disk array that are operated upon.

Data retrieved from storage $165_1$-$165_N$ may be stored in local memory. Typically, the address space of memory 105 is partitioned into pages or other analogous units. Applications 110 may then address memory 105 using virtual addresses (VAs), which include virtual page numbers (VPNs). The VAs are mapped to physical addresses (PAs) which are used to address physical memory 105. For example, the VAs and PAs may have a common offset from a base address, so that only the VPN needs to be converted into a corresponding physical page number (PPN).

The time needed to read data from storage system 106 may be considerable in some cases. As discussed in greater detail below, embodiments disclosed herein reduce perceived read latency by returning read requests before all reads dispatched to storage system 106 have completed. In one embodiment, an early read return (ERR) component 115 may attempt to fill a scatter-gather (SG) array received with a read request using data from a cache 117 which caches data read from storage system 106 according to any feasible cache algorithm. Note, in some embodiments, the cache may be a hardware cache provided as a discrete physical device, such as a solid state drive (SSD). The ERR component 115 may further dispatch reads to storage system 106 requesting data which is not available in cache 117. Before all such reads dispatched to storage system 106 have completed, ERR component 115 may return the read request received from the application if condition(s) of a given policy are satisfied. In one embodiment, the policy may be based on at least one of a percentage of data available for immediate return, a relative distribution of unavailable data, and an estimated time duration until full satisfaction of the read request. Prior to returning the read, the ERR component 115 may unmap unfilled pages of the SG array. Later accesses to such unmapped pages will generate page fault exceptions. A page fault handler 119 then blocks the application attempting to access the unmapped pages and unblocks the application after, for example, all elements of the SG array are filled and all pages of the SG array are mapped.

Figure 2:
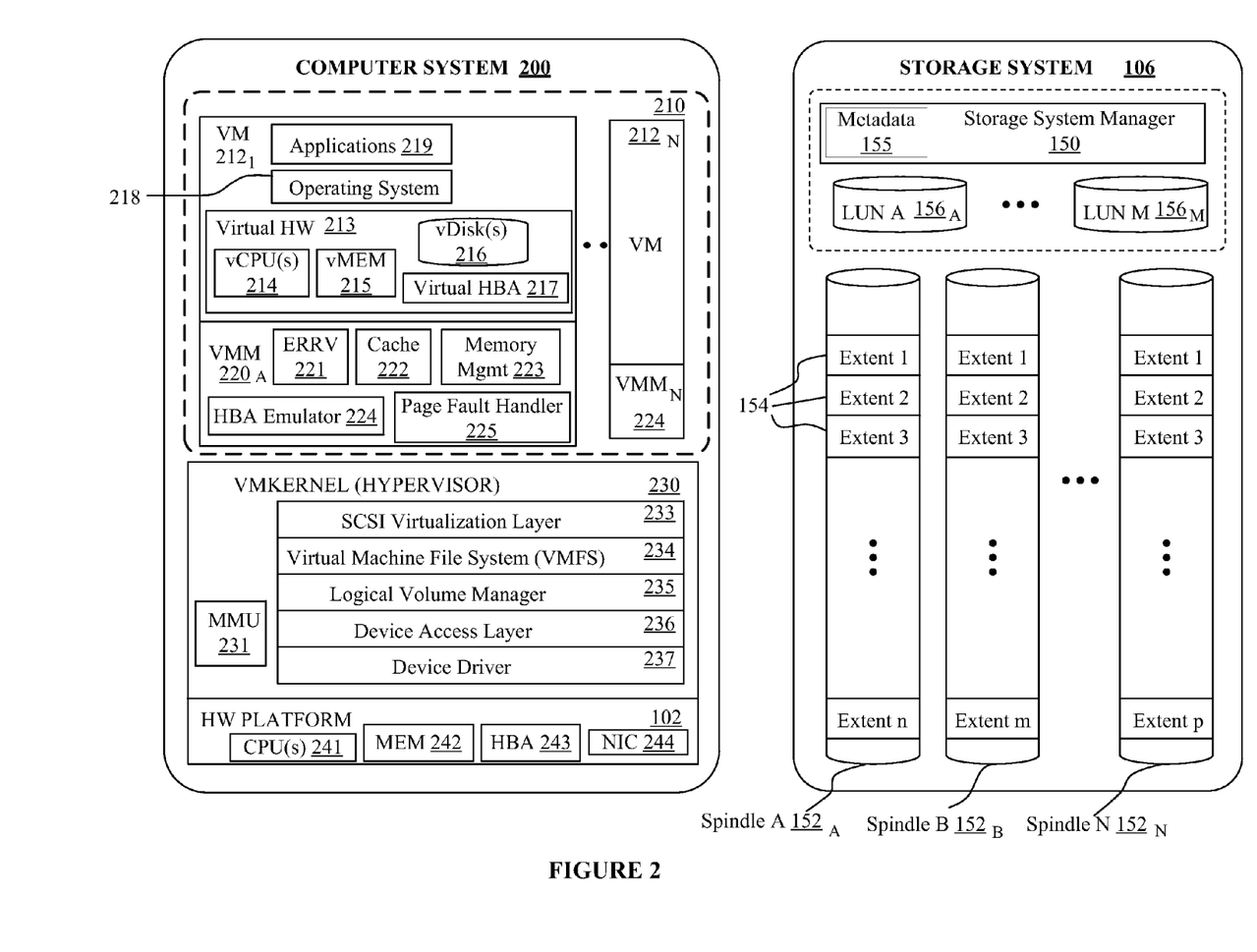
FIG. 2 illustrates a virtualized computer system connected to a storage system in which an embodiment of the invention may be practiced.

FIG. 2 depicts a virtualized computer system 200 in which embodiments may be implemented. The computer system 100 may be constructed on a conventional, typically server-class, hardware platform 140 that includes CPU(s) 241, memory 242, a host bus adapter (HBA) 243, and a network interface controller (NIC) 244. Hardware platform 140 is used to execute a virtual machine operating system ("VMKernel") 230 which supports virtual machine execution space 210 within which virtual machines (VMs) $212_1$-$212_N$ are executed. In turn, each of VMs $212_1$-$212_N$ implements a virtual hardware platform (e.g., virtual hardware 213) which includes, e.g., virtual CPU(s) 214, virtual memory 215, virtual disk 216, and virtual HBA 217. The virtual hardware platform supports execution of a guest operating system (e.g., operating system 218) and one or more client application programs (e.g., applications 219) running on the guest operating system. Example guest operating systems include Microsoft Windows® and Linux®. Typically, each of the guest operating systems includes a native filesystem layer, such as a New Technology Filesystem (NTFS) or Linux Third Extended Filesystem (ext3FS) type filesystem layer. These filesystem layers interface with virtual hardware platforms 213 to access, from the perspective of the guest operating systems, a data storage host adapter (HBA). The virtual hardware platforms (e.g., virtual HW 213) implement virtual HBAs (e.g., virtual HBA 217) that provide the appearance of the necessary system hardware support to enable execution of the guest operating systems transparent to the virtualization of the system hardware.

Filesystem read calls initiated by the guest operating system or applications running thereon are processed and passed through the virtual HBAs (e.g., virtual HBA 277) to adjunct virtual machine monitor layers (e.g., VMM $220_1$-$220_N$) that implement virtual system support necessary to coordinate operation with VMKernel 230. In particular, a host bus adapter emulator (e.g., HBA emulator 224) functionality enables system calls to be ultimately passed to HBA 243. System calls are passed to virtual machine file system (VMFS) 234 for coordinated implementation with respect to outgoing operation of all VMs $212_1$-$212_N$. That is, the native filesystems of the guest operating systems (e.g., operating system 218) perform read operations against virtual SCSI (Small Computer System Interface) devices presenting LUNs (e.g., virtual disk 216) visible to the guest operating systems. Of course, those with ordinary skill in the art will recognize the option of using hardware interface standards other than SCSI. The virtual SCSI devices are emulated LUNs actually maintained as files resident within storage space managed by VMFS 234. A SCSI virtualization layer 233 performs a mapping of permitted guest OS read operations against the emulated LUNs between LUNs visible to the guest operating systems (e.g., operating system 218) and data storage volumes visible to VMFS 234. A VMKernel-based logical volume manager 235 performs a further mapping to LUNs visible to logical volume manager via a device access layer 236, device driver 237, and network interface controller (NIC) 244 (or, HBA 243).

For example, the SCSI virtualization layer 233 may receive read operations (in the form of SCSI commands) from VMM layers $220_1$-$220_N$, and convert them into file system operations understood by VMFS 234. SCSI virtualization layer 233 may then issue these file system operations to VMFS 234. VMFS may in turn convert the file system operations to volume block operations, and provide the volume block operations to logical volume manager 235. Logical volume manager 235 is typically implemented as an intermediate layer between the driver and conventional operating system file system layers, and supports volume oriented virtualization and management of the LUNs accessible through NIC 246. Multiple LUNs may be gathered and managed together as a volume under the control of logical volume manager 235 for presentation to and use by VMFS 235 as an integral LUN. VMFS 235, in general, manages creation, use, and deletion of files stored in storage $165_1$-$165_N$ through the LUN abstraction discussed previously. Clustered file systems, such as VMFS 230, are described in U.S. Pat. No. 7,849,098, hereby incorporated by reference in its entirety. Logical volume manager 235 issues raw SCSI operations to device access layer 236 based on the LUN block operations. Device access layer 236 discovers storage $165_1$-$165_N$, and applies command queuing and scheduling policies to the raw SCSI operations. Device driver 237 understands the input/output interface of NIC 146 and sends the raw SCSI operations from device access layer 236 to HBA 243 or NIC 244 to be forwarded to storage $165_1$-$165_N$.

Data retrieved from storage $165_1$-$165_N$ may be stored in local memory. In contrast to the virtual memory discussed above with respect to FIG. 1, an extra level of addressing indirection is typically implemented in virtualized systems in that a virtual page number (VPN) is remapped twice in order to determine a physical page number (PPN) in physical memory 242. For example, a mapping module within guest OS 218 may translate guest VPN (GVPN) into a corresponding guest PPN (GPPN). A memory management module 223, which is typically located in VMM 220 but may be located elsewhere (e.g., in kernel 230), may then perform a second mapping from the GPPN issued by guest OS 218 into a PPN which is used to address physical memory 242. That is, the guest OS "believes" that it is directly addressing hardware using the GPPN, but from the perspective of the system software, the GPPN is a virtualized page number which is further mapped to the physical memory space of the hardware memory as a PPN.

In addition to memory management in the VMM 220, the kernel 230 includes a memory management module 232 which manages memory used by the kernel 230 itself, as well as memory allocated to the VMs 212. The memory management module 232 may include any algorithms for dynamically allocating memory among the different VMs 120.

Similar to the discussion above with respect to FIG. 1B, the time needed to retrieve data from storage system 106 may be considerable in virtualized computer system 200. To reduce perceived read latency, an early read return virtualization (ERRV) component 221 may return read requests received from guest OS 218 before all reads dispatched to storage system 106 have completed. In one embodiment, available data may first be retrieved from a cache 222 which is similar to the cache 117 discussed above. The ERRV component 221 may then dispatch IOs to storage system 160 requesting data not available in the cache 222. The ERRV component 221 may use a predefined policy to determine whether to return a read request before all IOs to storage system 160 have completed. In one embodiment, the policy may be based on at least one of a percentage of data available for immediate return, a relative distribution of unavailable data, and an estimated time duration until full satisfaction of the read request. In a further embodiment, the ERRV component 221 may predict using pattern recognition whether the guest OS 218 is performing prefetching and, if such is the case, return the read as complete after, e.g., a first portion of the data being read is available. Prior to returning the read, the ERRV component 221 may unmap unfilled pages of the SG array. Unmapping unfilled pages may include marking corresponding GPPNs as unmapped in a page table maintained by memory management module 223 for mapping between GPPN and PPN. As discussed in greater detail below, later accesses to such unmapped pages will generate page fault exceptions, which may be handled by stunning the VM whose applications 219 or guest operating system 218 are attempting to access the unmapped pages until, for example, all elements of the SG array are filled and all pages of the SG array are mapped.

Figure 3:
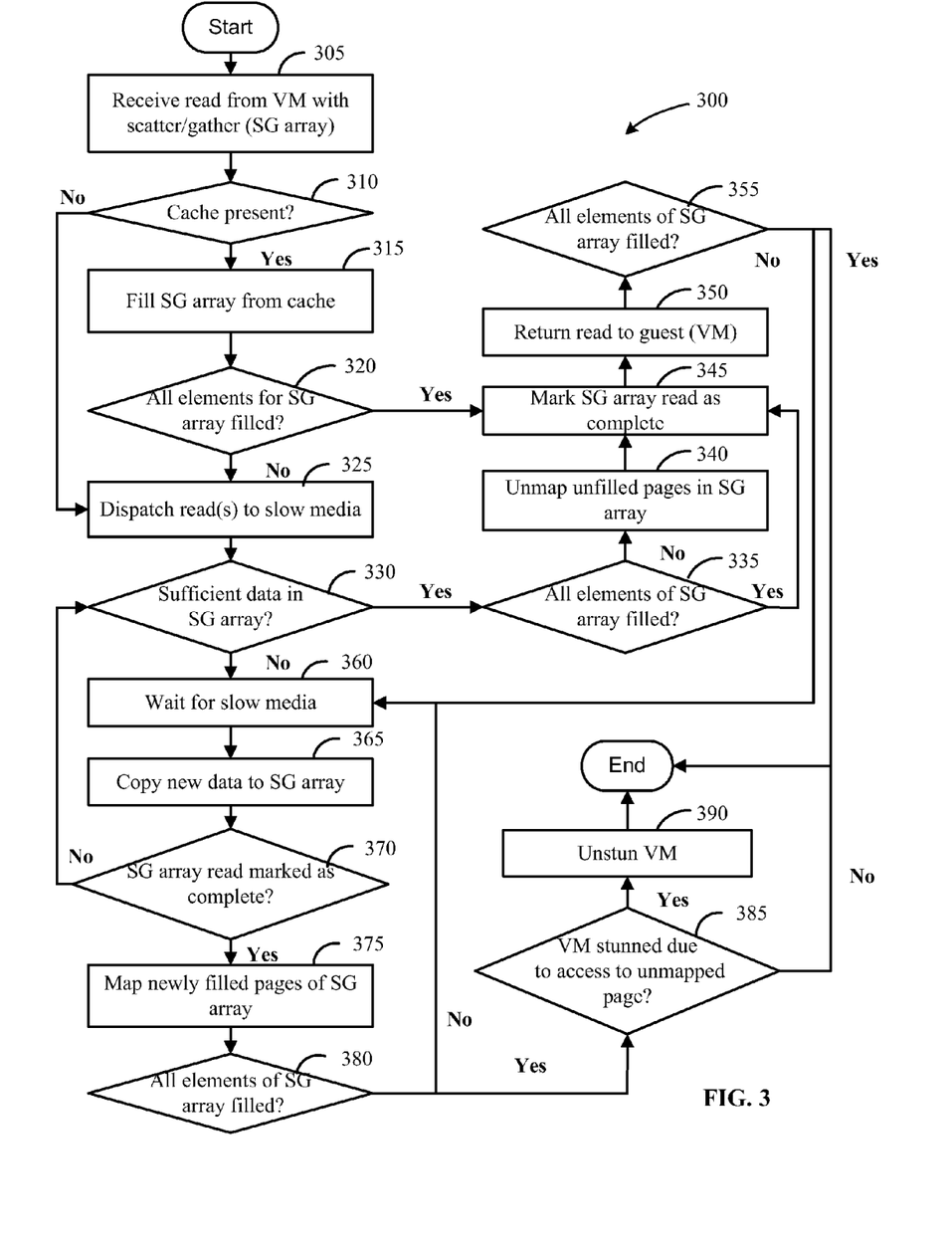
FIG. 3 illustrates a method for performing a read with early return virtualization, according to an embodiment of the invention.

FIG. 3 illustrates a method 300 for performing a read with early return virtualization, according to an embodiment. As shown, the method 300 begins at step 305, where a VMM receives a read with a scatter/gather (SG) array from a VM. For example, the VMM may receive a SCSI read command which includes the SG array. Here, the SG array may specify multiple ranges of virtual memory within which data being read is to be stored. For example, each entry of the SG array may specify one range of the virtual memory. Because an overhead is associated with executing a SCSI read command, use of the SG array may improve performance by reducing the number of read commands needed to transfer data to memory.

At step 310, an early read return virtualization (ERRV) component of the VMM determines if a cache is present within the VMM (or elsewhere). As discussed, the VMM may store recently read data in a cache so as to reduce the number of IOs to disk, thereby improving performance. If the ERRV component determines that a cache is present, then the ERRV component fills the SG array from the cache at step 315. That is, the ERRV component copies data from the cache to appropriate regions of memory specified by the SG array.

At step 320, the ERRV component determines if all elements of the SG array have been filled. If the ERRV component determines that all elements of the SG array have been filled, the method 300 continues at step 345, where the ERRV component marks the read as complete. For example, the ERRV may maintain a log of reads and mark an entry corresponding to the read as complete. The ERRV component then returns the read to the VM at step 350, and the method 300 ends thereafter.

If instead the ERRV component determines that not all elements of the SG array have been filled, or if no cache is present, the method 300 continues at step 325, where read(s) are dispatched to storage requesting the missing data. For example, the ERRV component may issue a SCSI command requesting such data to a VMKernel's SCSI virtualization layer. As discussed, the virtualization layer may convert the received SCSI command it into file system operations and issue the file system operations to VMFS. VMFS may in turn convert the file system operations to volume block operations, and provide the volume block operations to a logical volume manager, which issues raw SCSI operations to a device access layer based on the block operations. Device access layer may in turn apply command queuing and scheduling policies to the raw SCSI operations. A driver which understands the input/output interface of a NIC or HBA may then send the raw SCSI operations from device access layer to the NIC or HBA to be forwarded to the media.

At step 330, the ERRV component determines whether sufficient data has been received and copied to the SG array to satisfy condition(s) of a policy such that the read may be returned to the VM as complete before all request(s) dispatched to the media have been satisfied. Doing so releases the reader to continue as if the read were actually completed, thereby reducing perceived read latency while permitting the reader and the read to execute in parallel.

In one embodiment, the policy used may be based on a percentage of data available for immediate return, a relative distribution of unavailable data, or an estimated time duration until full satisfaction of the read request. For example, the ERRV component may determine that the SG array includes sufficient data if a given percentage of the SG array's elements are filled. As another example, the ERRV component may determine that the SG array includes sufficient data if 100% of the first X % of array elements, plus Y % of the remainder, are filled. In yet another case, the ERRV component may determine that the SG array includes sufficient data if the number of outstanding reads dispatched to the media is below a given threshold. Of course, other policies may be used to determine whether the scatter-gather array includes sufficient data.

Further, the ERRV component may use pattern recognition techniques to determine whether the guest OS is performing a prefetch with the read request. For example, the guest OS may execute a sequential read-ahead algorithm to prefetch memory pages which are predicted to be accessed by an application as a result of previous sequential data accesses by the application. In such a case, the guest OS may issue read requests for pages with sequential locality in terms of the temporal order in which the guest OS accesses the data. In turn, the ERRV component may predict that the guest OS is performing such sequential read-ahead based on the sequential locality of pages being requested. If the ERRV predicts that the guest OS is performing sequential read-ahead with the read request, the ERRV component may return the read as complete when, for example, the first X % of the requested pages are available. If the remaining pages are indeed being prefetched, such pages would at best be accessed by the application at a later time. As a result, returning such pages after returning the first X % of pages may have no adverse consequences. Of course, other pattern recognition techniques may be used, depending on, e.g., the types of prefetching algorithms used (or likely to be used) by the guest OS.

If sufficient data has been received at step 330, then at step 335 the EERV component determines if all elements of the SG array have been filled as was done at step 320. If all elements have not been filled, then at step 340, the ERRV component unmaps unfilled pages in the SG array. As discussed, a guest virtual page number (GVPN) is remapped twice in order to determine a page of physical memory. The GVPN is translated by the guest OS into a corresponding guest PPN (GPPN), and a memory management module in the VMM performs a further mapping from the GPPN into a machine page number PPN. Unmapping unfilled pages may thus include marking corresponding GPPNs as unmapped in a page table maintained by the memory management module for mapping between GPPN and PPN. Doing so causes a page fault interrupt to be generated by processor hardware whenever an unfilled page in the SG array is accessed by an application or guest OS running on the guest VM. As discussed in greater detail below, the VMM may stun the VM in such a case, and unstun the VM at a later time, e.g., after all elements of the SG array are actually filled.

If all elements of the SG array were determine to have been filled at step 335 or after the ERRV unmaps unfilled pages at step 340, the ERRV component marks the SG array read as "complete" at step 345. At step 350, the ERRV component returns the SG array read to the guest VM. If the SG array read is asynchronous, the ERRV component may make a callback notifying the guest VM of the completed read. If the SG array read is synchronous, the ERRV may unblock a blocked guest VM and return the read.

As discussed, the ERRV may determine at step 355 that all elements of the SG array are filled, and the method 300 ends thereafter. Alternatively, if the ERRV determines that elements of the SG array remain unfilled, the method 300 continues at step 360, where the ERRV component waits for additional IOs to complete. At step 365, the ERRV component copies additional data received to the SG array.

At step 370, the ERRV component determines if the SG array read is marked as complete. If the SG array read is not marked as complete, the method 300 returns to step 330, where the ERRV component again determines if sufficient data is in the SG array. Alternatively, if the SG array read is marked as complete (e.g., if the ERRV had previously determined that "sufficient" data was present in the SG array, unmapped unfilled pages, marked the read as complete, returned the read to the VM, etc.), the method 300 continues at step 375, where the ERRV component maps newly filled pages of the SG array. Similar to unmapping unfilled pages, mapping newly filled pages may include updating a page table having mappings between GPPN and PPN to include translations of the appropriate GPPNs to PPNs where the newly filled pages are stored.

At step 380, the ERRV determines if all elements of the SG array have been filled. If unfilled elements remain then the method 300 returns to step 360, where the EERV component waits for additional IOs to complete. If all elements have been filled, the VMM determines, at step 385, if the VM is stunned, and unstuns the VM at step 390 if the VM is stunned. As discussed, the VM may be stunned as a result of an attempted access to an unmapped SG array page. Stunning the VM may include, for example, stopping vCPUs of the VM and marking the VM as non-executable such that a context switch cannot be made to the VM. The VMM may later unstun the VMM by starting the vCPUs, marking the VM as executable, etc. after all elements of the SG array are filled and mapped. Of course, more aggressive policies may also be used to determine when to unstun the VM. For example, one policy may permit the VM to be unstunned after the page being accessed is mapped, provided that adjacent pages have also been mapped. In the case of a more aggressive policy, the method 300 may be modified to move the check at step 380 to be after step 390.

Figure 4:
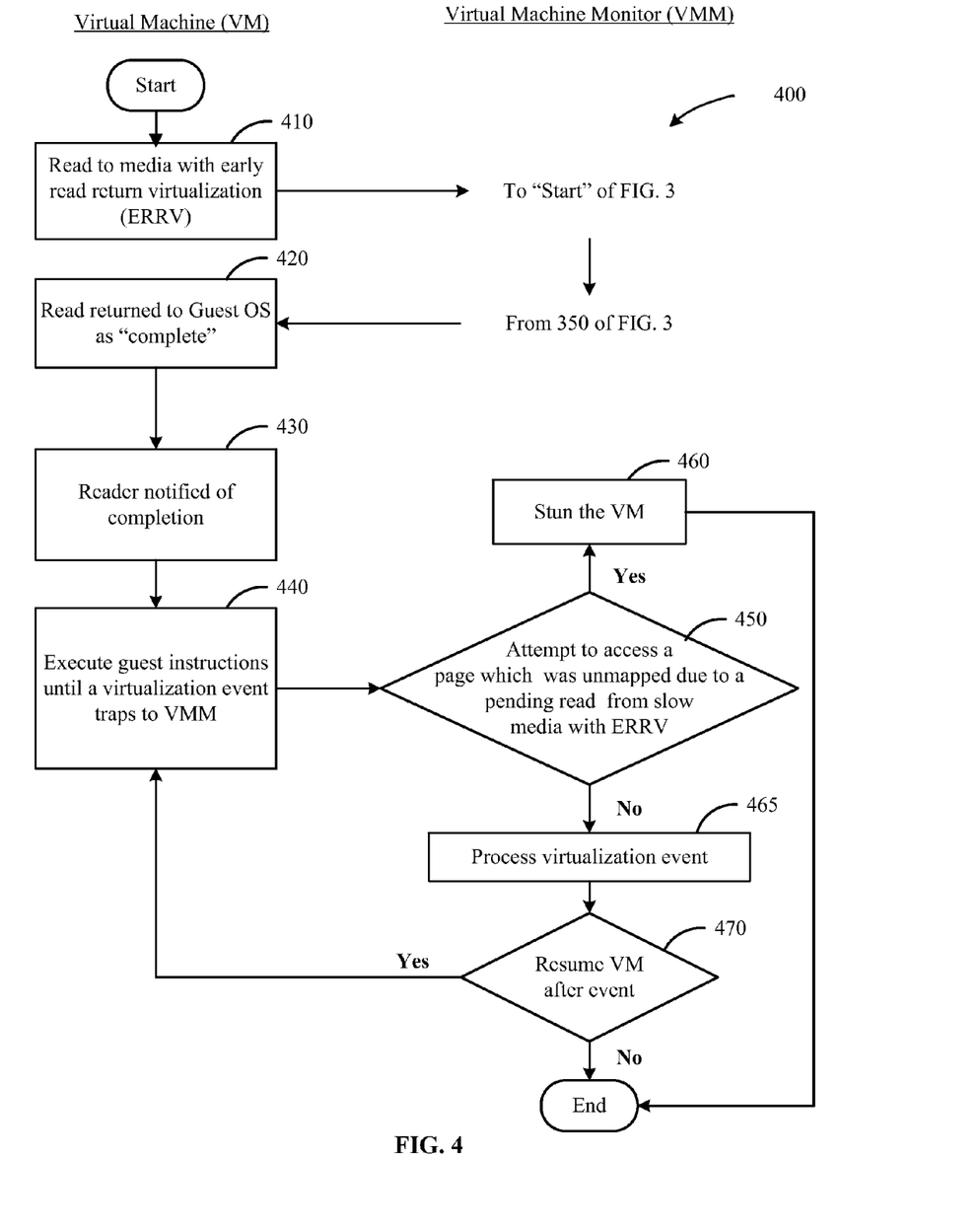
FIG. 4 illustrates a method for returning read requests early and handling accesses to pages which are unavailable due to pending reads from media, according to an embodiment of the invention.

FIG. 4 illustrates a method for returning read requests early and handling accesses to pages which are unavailable due to pending reads from media, according to an embodiment. As shown, the method 400 begins at step 410, where a guest OS makes a read to a media with ERRV (e.g., in response to a file access request by an application). The read may be synchronous or asynchronous. After the read is received by the VMM, the method 400 proceeds to the start of FIG. 3 for processing of the read request by an ERRV component of the VMM and continues through the steps of the method 300 until step 350. At step 420, the VMM returns the read as "complete" to the guest OS, and, at step 430, the reader (application or guest OS) is notified of the completion.

At step 440, the VM executes further instructions until a virtualization event traps to the VMM. As discussed, the ERRV component may determine that sufficient data is available in an SG array and return a read as complete after unmapping unfilled pages in the SG array. If the application or guest OS then attempts to access such an unfilled page, processor hardware will generate a page fault interrupt, and control will be returned to the VMM where the fault will be handled by the memory management module of the VMM. In particular, the page fault interrupt may initiate a context switch to the VMM. Of course, other virtualization events may also trap to the VMM.

After a virtualization event has trapped to the VMM, the VMM determines the type of event and dispatches the event to the appropriate handler. If the appropriate handler is the memory management module and if the page fault handler component of the VMM determines at step 450 that an attempt was made to access a page which was unmapped due to a pending read from media with ERRV, then the VMM stuns the VM at step 460. Otherwise method 400 continues at step 465. If the VM is stunned, it may later be unstunned by the VMM after, e.g., all elements of the SG array are filled and mapped. As discussed, more aggressive policies may also be used to determine when to unstun the VM. For example, one policy may permit the VM to be unstunned after the page being accessed is mapped, provided that adjacent pages have also been mapped.

At step 465 the VMM processes other virtualization events, as appropriate. At step 470, the VMM determines whether to resume the VM after the event. If the VMM determines that the VM should resume, then the method 400 returns to step 440, where additional guest instructions are executed until another virtualization event traps to the VMM.

Although described with respect to virtual machines, in an alternative embodiment, an operating system may return reads early to an application running on the operating system. Similar to the discussion above, an early read return component of the OS may unmap unfilled pages in a scatter-gather array which stores data for the read. An attempt by the application to access such unmapped pages may trap to the OS, and the OS may block the application until further IOs have completed based on a given policy.

Advantageously, embodiments described herein return reads as complete even when some IOs to media have not returned, thereby reducing read latency perceived by the reader (e.g., a guest OS or application) and permitting parallel execution of the reader and the read. Returning read requests early may be particularly beneficial where such requests are satisfied slowly, such as when large read requests are made to cloud storage. In addition, where a guest OS performs prefetching, some pages being read may not be immediately accessed by an application. As a result, returning reads before all IOs have completed may have no adverse consequences.

The various embodiments described herein may employ various computer-implemented operations involving data stored in computer systems. e.g., these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that VMs present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for reducing perceived read latency, comprising:
    receiving a read request from a reader;
    issuing, via one or more processors and in response to the read request, input-output requests (IOs) to one or more storage devices; and
    after completion of a portion, but not all, of the IOs issued for the read request:
        returning a response to the reader that the read request has completed based on one or more conditions of a predefined first policy, wherein the first policy is defined based on at least one of a percentage of data corresponding to the read request available to be returned, a relative distribution of unavailable data in a scatter-gather array configured to store data associated with the read request, and an estimated time duration until full satisfaction of the read request, and
        unmapping unfilled pages of the scatter-gather array so that accesses to the unmapped unfilled pages generate page fault exceptions.

2. The method of claim 1, further comprising, after returning the response that the read request has completed, copying additional pages returned from the storage devices in response to the IOs to the scatter-gather array and mapping the copied pages.

3. The method of claim 1, wherein the first policy requires a percentage of the scatter-gather array to be filled.

4. The method of claim 1, wherein the first policy requires a first percentage of the scatter-gather array to be filled and a second percentage of a remainder of the scatter-gather array to be filled.

5. The method of claim 1, further comprising, prior to issuing the IOs, copying pages to the scatter-gather array from a cache.

6. The method of claim 1, wherein the reader is one of a guest operating system (OS) running on a virtual machine and an application running on the guest OS.

7. The method of claim 6, further comprising:
after returning the response that the read request has completed, stunning the virtual machine if the reader attempts to access one of the unmapped unfilled pages; and
unstunning the virtual machine after at least the one of the unmapped unfilled pages is filled and mapped.

8. The method of claim 6, wherein the reader is the guest OS, and wherein determining whether the one or more conditions of the first policy are satisfied includes predicting, based on pattern matching, whether the read request was issued by the guest OS to prefetch one or more pages.

9. The method of claim 1, wherein the storage devices include devices in a cloud storage system.

10. A non-transitory computer-readable storage medium embodying computer program instructions for reducing perceived read latency, the computer program instructions implementing a method, the method comprising:
receiving a read request from a reader;
issuing, in response to the read request, input-output requests (IOs) to one or more storage devices; and
after completion of a portion, but not all, of the IOs issued for the read request:
returning a response to the reader that the read request has completed based on one or more conditions of a predefined first policy, wherein the first policy is defined based on at least one of a percentage of data corresponding to the read request available to be returned, a relative distribution of unavailable data in a scatter-gather array configured to store data associated with the read request, and an estimated time duration until full satisfaction of the read request, and
unmapping unfilled pages of the scatter-gather array so that accesses to the unmapped unfilled pages generate page fault exceptions.

11. The computer-readable storage medium of claim 10, the method further comprising, after returning the response that the read request has completed, copying additional pages returned from the storage devices in response to the IOs to the scatter-gather array and mapping the copied pages.

12. The computer-readable storage medium of claim 10, wherein the first policy requires a percentage of the scatter-gather array to be filled.

13. The computer-readable storage medium of claim 10, wherein the first policy requires a first percentage of the scatter-gather array to be filled and a second percentage of a remainder of the scatter-gather array to be filled.

14. The computer-readable storage medium of claim 10, the method further comprising, prior to issuing the IOs, copying pages to the scatter-gather array from a cache.

15. The computer-readable storage medium of claim 10, wherein the reader is one of a guest operating system (OS) running on a virtual machine and an application running on the guest OS.

16. The computer-readable storage medium of claim 15, the method further comprising:
after returning the response that the read request has completed, stunning the virtual machine if the reader attempts to access one of the unmapped unfilled pages; and
unstunning the virtual machine after at least the one of the unmapped unfilled pages is filled and mapped.

17. The computer-readable storage medium of claim 16, wherein the reader is the guest OS, and wherein determining whether the one or more conditions of the first policy are satisfied includes predicting, based on pattern matching, whether the read request was issued by the guest OS to prefetch one or more pages.

18. The computer-readable storage medium of claim 10, wherein the storage devices include devices in a cloud storage system.

19. A system, comprising:
a processor; and
a memory, wherein the memory includes a program for reducing perceived read latency, the program being configured to perform operations comprising:
receiving a read request from a reader,
issuing, in response to the read request, input-output requests (IOs) to storage device, and
after completion of a portion, but not all, of the IOs issued for the read request:
returning a response to the reader that the read request has completed based on one or more conditions of a predefined first policy, wherein the first policy is defined based on at least one of a percentage of data corresponding to the read request available to be returned, a relative distribution of unavailable data in a scatter-gather array configured to store data associated with the read request, and an estimated time duration until full satisfaction of the read request; and
unmapping unfilled pages of the scatter-gather array so that accesses to the unmapped unfilled pages generate page fault exceptions.

20. The system of claim 19, wherein the reader is a guest operating system (OS) running on a virtual machine, wherein determining whether the one or more conditions of the first policy are satisfied includes predicting, based on pattern matching, whether the read request was issued by the guest OS to prefetch one or more pages.

21. The system of claim 19, the operations further comprising, prior to issuing the IOs, copying pages to the scatter-gather array from a cache, wherein the cache is a discrete physical device.

* * * * *